Aug. 18, 1959 A. H. FAULKNER 2,900,606

TRANSISTOR MULTIVIBRATOR

Filed Aug. 1, 1956

INVENTOR.
Alfred H. Faulkner
BY
Smith, Olsen, Baird and Miller
Attys.

2,900,606

TRANSISTOR MULTIVIBRATOR

Alfred H. Faulkner, Chicago, Ill., assignor to General Telephone Laboratories, Incorporated, a corporation of Delaware Application August 1, 1956, Serial No. 601,466

12 Claims. (Cl. 331—113)

The present invention relates to multivibrator circuits and particularly to transistorized multivibrator circuits.

It is the object of the present invention to provide a new and improved transistor multivibrator for which the cycle period and the pulse width ratio per cycle are controllable.

A more specific object of the present invention is to provide an improved transistor multivibrator circuit for which the cycle period and the pulse width ratio per cycle are controllable independently of one another.

An additional object of the invention is to provide a new and improved multivibrator circuit including two transistor stages for which the conduction biasing potential and, accordingly, the operating frequency of the circuit, is controlled directly by the voltage applied jointly to the emitter electrodes of the transistors and including two cross-coupling capacitors for which the charging paths include common resistors connected in an arrangement that permits the ratio of the resistance of the two paths to be varied inversely so that the ratio of the conduction periods of the two transistors is varied accordingly.

Further features of the invention pertain to the particular arrangement of the circuit elements of the multivibrator circuit, whereby the above outlined objects and additional operating features thereof are attained.

Figure 1:
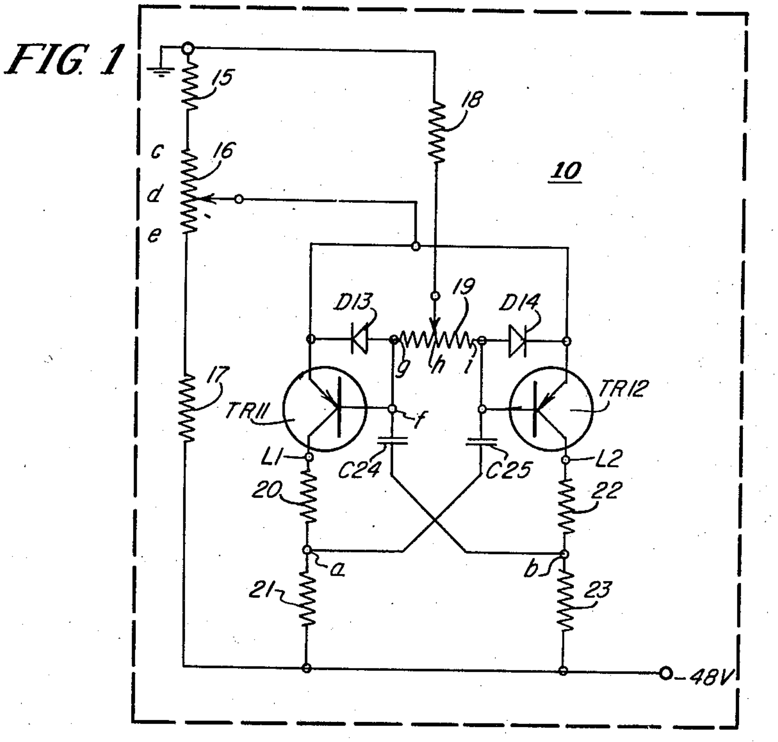
Figure 2:
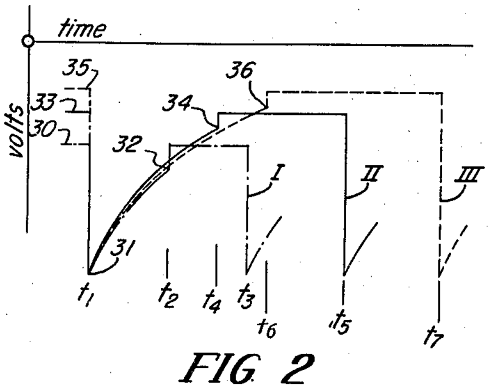
Figure 3:
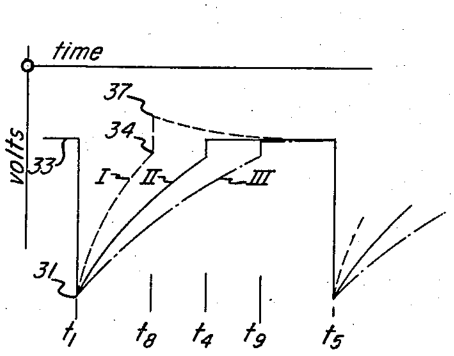

The invention, both as to its organization and method of operation, together with further objects and advantages thereof, will be best understood by reference to the following specification taken in conjunction with the accompanying drawing, in which:

Figure 1 is a schematic diagram of a multivibrator circuit embodying the principles of the present invention; and, Figs. 2 and 3 illustrate the voltage waveforms occurring at a particular point in the circuit of Fig. 1 during one cycle of operation thereof and in response, respectively, to a change in the emitter bias potential and to a change in the impedance of the capacitive discharge paths.

Referring specifically to Fig. 1, the multivibrator circuit thereof includes the transistors TR11 and TR12, which may be of the PNP junction type, and the diodes D13 and D14, which may be of the crystal type, connected between the base and emitter electrodes of the transistors TR11 and TR12, respectively. Potentials are applied to various points in the transistor circuit from a voltage divider including the resistor 15, the potentiometer resistor element 16, and a resistor 17 connected between ground potential and —48 volts.

Considering now the operation of the circuit of Fig. 1 and assuming that the transistor TR12 is at least partially conducting and that the transistor TR11 has just started to conduct, the potential at the collector electrode of the transistor TR11 rises from substantially —48 volts to the potential of the emitter electrode which is determined by the center tap setting of the potentiometer 16 connected jointly to the emitter electrodes of TR11 and TR12. Accordingly, the voltage at the junction point *a* between the resistors 20 and 21 comprising the collector load resistance rises from a value of approximately —48 volts to a value as determined by the collector current flow therethrough. Thereupon the capacitor C25 which is connected between the point *a* and the base electrode of the transistor TR12, which is in a substantially discharged state, transfers the change in voltage at the point *a* to the base electrode of the transistor TR12 and to the junction between the resistor element of the potentiometer 19 and the diode D14. The diode D14 is poled so as to conduct current from the base electrode to the emitter electrode of the transistor TR12. In response to the transfer of the voltage through the capacitor C25 the base electrode is biased positive with respect to the emitter electrode of the transistor TR12 so that TR12 is rendered nonconductive and the diode D14 is rendered conductive in order to limit the reverse-voltage between the base and emitter electrodes to the potential drop through the diode D14. When the transistor TR12 is rendered nonconductive the potential at the junction point *b* of the resistors 22 and 23 in the collector load circuit thereof begins to drop from a potential determined by the current flow through the collector load to substantially —48 volts so that the capacitor C24 connected between the point *b* and the junction between the base electrode of the transistor TR11 and the diode D13 and the resistor element of the potentiometer 19, which is substantially discharged at this time, transfers the decrease in voltage to the last named junction. Accordingly, the transistor TR11 is biased full conductive in the emitter-base path and conducts a large current in the emitter-collector path and the capacitor C24 begins to charge through the connected portion of the resistor element of the potentiometer 19 and the resistor 18 to ground potential.

As the emitter electrode of the transistor TR11 is at this time positive with respect to the base electrode, the diode D13 is nonconductive and the capacitor C24 proceeds to charge through the above traced path until the potential at the base electrode is substantially equal to the potential at the emitter electrode; at which time the transistor TR11 starts to turn off and thereby restrict the current flow in the collector load circuit thereof. Thereupon the potential at the point *a* in the collector load circuit decreases from the established potential to —48 volts so that this decrease in potential thereat is transferred via the capacitor C25 to the junction between the base electrode of the transistor TR12 and the diode D14 and the resistor element of the potentiometer 19. Accordingly, the transistor TR12 is rendered conductive in its emitter-base path and conducts a large quantity of current in its emitter-collector path, whereby the potential at the point *b* in the collector load circuit thereof increases from —48 volts to a potential as determined by the current flow through the collector load resistors.

The change in potential at the point *b* is transferred via the capacitor C24 to the junction between the base electrode of the transistor TR11, the diode D13 and the resistor element of a potentiometer 19, whereby the transistor TR11 is biased nonconductive and the diode D13 is rendered conductive and establishes the potential at the last named junction substantially the same as the potential at the emitter electrode of the transistor TR11 so that the capacitor C24 is rapidly discharged therethrough. The capacitor C25 now charges through that portion of the resistor element of the potentiometer 19 individual thereto and the resistor 18 to ground potential. As the emitter electrode of the transistor TR12 is at this time positive with respect to the base electrode thereof the diode D14 is nonconductive. The transistor TR12 remains conductive until the capacitor C25 charges to a potential substantially equal to the potential on the emitter electrode whereupon the transistor TR12 is rendered nonconductive in a manner as previously explained and the transistor TR11 is rendered conductive in a manner as previously explained.

It is noted in Fig. 1, that the center tap of the potentiometer 16 is variable from a position *c* through a position *d* to a position *e* for producing a corresponding variation from a higher to a lower voltage on the emitter electrodes of the transistors TR11 and TR12. Accordingly, the position of the center tap of the potentiometer 16 determines the conduction potential at the emitter electrodes of both transistors TR11 and TR12. In the collector load circuits of the transistors TR11 and TR12 the resistors 20 and 21 and the resistors 22 and 23 are chosen so that the variation in the potential at the points *a* and *b* during the conduction period of the associated transistors vary only slightly in response to much larger changes in the voltage at the emitter electrodes thereof so that the capacitors C24 and C25 discharge to substantially the same potential for any setting of the potentiometer 16 center tap and always charge towards ground potential. Accordingly, the setting of the center tap of the potentiometer 16 merely determines the potential at which the transistors TR11 and TR12 are rendered conductive and, accordingly, changes the operating period of the circuit without affecting the ratio of the conduction periods of the transistors TR11 and TR12.

It is to be understood that two load potential points L1 and L2 are provided at the junction between the collector and the associated load resistance of transistors TR11 and TR12, respectively. The outputs at load points L1 and L2 are identical but opposite in sense, L1 going positive while L2 goes negative and vice versa.

Fig. 2 illustrates the various voltage waveforms appearing at a point *f*, the junction between the base electrode of the transistor TR11 and the diode D13 and the resistor element of the potentiometer 19, for various settings of the center tap of the potentiometer 16 and for the condition in which the center tap of the potentiometer 19 is at position *h*. Specifically, curve I illustrates the voltage waveform at point *f* when the center tap of the potentiometer 16 is at position *e*; the curve II illustrates the potential at point *f* when the center tap of the potentiometer 16 is at position *d*; and curve III represents the voltage at point *f* when the center tap of the potentiometer 16 is at position *c*.

Referring now to curve I, at the time $t_1$ when the transistor TR11 is rendered conductive, the voltage at point *f* drops from a potential represented by a level 30 to a lower potential represented by a level 31. Immediately thereafter the capacitor C24 begins to charge towards ground potential thereby raising the potential at point *f* to a new potential represented by a level 32 which correspnods to the potential established at the emitter electrode of the transistor TR11 by the potentiometer 16, at which time $t_2$ the transistor TR11 is rendered nonconductive and the potential at point *f* increases to the level 30. The potential is maintained at this level 30 during the period that the transistor TR12 is conducting and the capacitor C25 is charging to the potential represented by level 32, at which time $t_3$, the potential at the point *f* again drops down to a potential represented by the level 31.

Considering now the potential at point *f* when the center tap of the potentiometer 16 is at position *d*, as shown in curve II of Fig. 2, at the time $t_1$, when the transistor TR11 is rendered nonconductive, the voltage at the point *f* drops from a potential represented by level 33 to a potential substantially equal that represented by level 31 and thereafter increases as the capacitor C24 charges through a voltage represented by level 32 to a potential represented by the level 34 which corresponds to the potential established on the emitter electrode of the transistor TR11 by the center tap of the potentiometer 16 positioned at the point *d*. Thereupon, at the time $t_4$, the transistor TR11 is rendered nonconductive and the voltage at the point *f* increases to the potential represented by level 33. The voltage at the point *f* is maintained at this level during this period that the transistor TR12 is conductive and the capacitor C25 is charging to the emitter potential thereof at which time $t_5$ the transistor TR12 is rendered nonconductive and TR11 is rendered conductive and the voltage at the point *f* decreases to a potential represented by level 31.

Considering now the circumstance of the center tap of the potentiometer 16 at position *c*, responsive to the transistor TR11 being rendered conductive at the time $t_1$, the voltage at the point *f* falls from a potential represented by a level 35 to the potential represented by the level 31 and thereafter the voltage at the point *f* increases as the capacitor C24 charges toward ground potential through voltages represented by level 32 and level 34 to a potential represented by level 36 which corresponds to the potential of the emitter electrode as established thereon from the potentiometer 16. Thereupon, at the time $t_6$, the transistor TR11 is rendered nonconductive and the potential at point *f* increases to a level corresponding to that represented by the level 35 and remains at that potential during the period that the transistor TR12 is conductive and the capacitor C25 is charging towards the potential of the emitter electrode of TR12. When TR12 is rendered nonconductive at the time $t_7$, the transistor TR11 is rendered conductive and the voltage at the point *f* drops from the potential represented by the level 35 to the potential represented by the level 31. It is understood that waveforms identical to those shown in Fig. 2, but 180° out of phase therewith, are generated at the junction between the capacitor C25, the base electrode of the transistor TR12, the diode D14 and the resistor element of the potentiometer 19.

Considering now the operation of the circuit with the center tap of the potentiometer 16 fixed at position *d* and with the center tap of the potentiometer 19 respectively at position *g*, position *h* and position *i*, Fig. 3 illustrates the voltage waveforms appearing at the junction point *f* under these various conditions. Specifically, with the center tap of the potentiometer 19 at position *g* the voltage waveform at the point *f* during one cycle of operation is represented by curve I of Fig. 3; with the center tap of the potentiometer 19 at position *h* the voltage appearing at point *f* is represented by curve II of Fig. 3 and is identical to that represented by curve II of Fig. 2; and with the center tap of the potentiometer 19 at position *i* the voltage at the point *f* is represented by the curve III of Fig. 3.

Referring specifically to the operation of the circuit with the center tap of the potentiometer 19 at position *g*, when the transistor TR11 is nonconductive, the voltage at the point *f* corresponds to a potential represented by the level 33 in Fig. 3 which is identical to the potential represented by the level 33 in Fig. 2. Thereafter at the time $t_1$, when the transistor TR11 is rendered conductive the voltage at the point *f* drops to the potential represented by the level 31, and the capacitor C24 begins to charge through the resistor 18 to ground potential at a rate represented by curve I of Fig. 3 until a time, $t_8$, when the point *f* reaches the potential represented by level 34, at which time the transistor TR11 is rendered nonconductive and the transistor TR12 is rendered nonconductive and the transistor TR12 is rendered conductive. Immediately the potential at the point *f* increases toward a potential corresponding to a level 37, which potential decreases during the period that the transistor TR12 is conductive toward the potential corresponding to the level 33. Transistor TR12 conducts for a longer period than transistor TR11 because the capacitor C25 must at this time charge through a relatively high impedance path represented by a resistor 18 and by the total resistance of resistor element of the potentiometer 19. When the capacitor C25 finally charges to the potential of the emitter electrode of the transistor TR12 at the time $t_5$, TR12 is rendered nonconductive and the transistor TR11 is rendered conductive whereby one cycle of operation is completed and the potential at the point *f* decreases from the potential corresponding to level 33 to the potential corresponding to the level 31.

Considering now the operation of the circuit with the center tap of the potentiometer 19 at position *h* and the center tap of the potentiometer 16 at position *d*, it is noted that these circuit conditions are the same as those considered previously with reference to curve II of Fig. 2; accordingly, and as pointed out above, the voltage waveform appearing at the junction point *f* during one cycle of circuit operation under the above conditions is as shown in curve II of Fig. 3 and is identical to the waveform illustrated by curve II of Fig. 2; therefore the operation of the circuit in generating the waveform of curve II of Fig. 3 is not given further consideration herein.

Considering now the operation of the circuit with center tap of the potentiometer 19 at position *i*, when the transistor TR11 is nonconductive the voltage at the point *f* corresponds to the potential at the level 33 and thereafter at the time $t_1$, when the transistor TR11 is rendered conductive the voltage at the point *f* drops to a potential corresponding to the level 31. At this time then the capacitor C24 charges through the total resistance of the resistor element of the potentiometer 19 and through the resistor 18 to ground potential at a rate as illustrated by the curve III of Fig. 3 until the time, $t_9$, when the potential at the point *f* is substantially equal to that represented by level 34, at which time the transistor TR11 is rendered nonconductive and the potential at the point *f* increases to a potential corresponding to the level 33. The potential at the point *f* is maintained at this latter level during the period that the transistor TR12 is conductive and the capacitor C25 is charging through the low impedance path including only the resistor 18 to the emitter potential on TR12, at which time, $t_5$, the potential at point *f* drops again from the potential represented by level 33 to the potential represented by level 31.

As can be seen from Fig. 3, the period for a cycle of operation of the multivibrator circuit remains substantially unchanged with changes in the position of the center tap of the potentiometer 19 but the ratio of the on-time to the off-time of the transistors change very markedly with changes in the position of the center tap of the potentiometer 19. It may be noted further that the ratio of the on-time of one transistor to the on-time of the other transistor during a cycle of operation varies inversely as the center tap position is moved between positions *g* and *i* and specifically that the ratio of the on-time of TR11, from $t_1$ to $t_8$, to the on-time of TR12, from $t_8$ to $t_5$, when the center tap is at position *g* is the inverse of the ratio of the on-time of TR11, from $t_1$ to $t_9$, to the on-time of TR12, from $t_9$ to $t_5$ when the center tap is at position *i*.

Accordingly, there has been presented herewith a transistorized multivibrator circuit having separate and independent controls for varying the emitter potentials of the transistor therein and, also, for varying the impedance of the capacitive charging circuits whereby a cycle period may be changed without varying the ratio of the on and off times of the transistors included in the circuit and, whereby the ratios of the on and off times of the transistors in the circuit may be varied without changing the periods of the cycles and, whereby, the on-off ratios of the transistors in the circuit and the periods of the cycle of the circuits may be selectively varied by varying both the emitter potential control and the impedance control for the capacitive charging paths.

Any number of possible values may be assigned to the circuit elements disclosed in Fig. 1; however, the values employed in a circuit reduced to practice are as follows:

| | | |
|---|---|---|
| TR11 | | 2N37 |
| TR12 | | 2N37 |
| D13 | | 1N90 |
| D14 | | 1N90 |
| 15 | ohms | 1,000 |
| 16 | do | 1,000 |
| 17 | do | 3,300 |
| 18 | do | 10,000 |
| 19 | do | 50,000 |
| 20 | do | 8,200 |
| 21 | do | 18,000 |
| 22 | do | 8,200 |
| 23 | do | 18,000 |
| C24 | microfarads | 2 |
| C25 | do | 2 |

In view of the foregoing it is apparent that there has been provided a multivibrator circuit of improved connection and arrangement so that the cycle period and the pulse width ratio per cycle are controllable independently of one another.

While there has been described what is at present considered to be the preferred embodiment of the invention, it will be understood that various modifications may be made therein, and it is intended to cover in the appended claims all such modifications as fall within the time spirit and scope of the invention.

What is claimed is:

1. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, whereby said first reactive means is responsive to the first transistor being rendered non-conductive and being rendered conductive for biasing said second transistor respectively conductive and non-conductive and said second reactive means is responsive to the second transistor being rendered non-conductive and being rendered conductive for biasing said first transistor respectively conductive and non-conductive, a first unidirectional conductive device connected between the emitter electrode and the base electrode of said first transistor, and a second unidirectional conductive device connected between the emitter electrode and the base electrode of said second transistor, said first unidirectional conductive device being poled to provide a by-pass connection between the emitter electrode and the collector electrode of said first transistor when the same is biased non-conductive and said second unidirectional conductive device being poled to provide a by-pass connection between the emitter electrode and the collector electrode of said second transistor when the same is biased non-conductive.

2. The multivibrator circuit set forth in claim 1, wherein said first reactive means and said second reactive means comprise respectively capacitors.

3. The multivibrator circuit set forth in claim 2, wherein said first unidirectional conducting device and said second unidirectional conducting device comprise respectively crystal diodes.

4. The multivibrator circuit set forth in claim 3, wherein said first impedance element and said second impedance element jointly comprise the resistor element of a potentiometer whereof the resistor element is connected between the base electrode of said first transistor and the base electrode of said second transistor.

5. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, and means simultaneously to increase the value of one of said impedance elements and to decrease the value of the other of said impedance elements by like amounts to change the pulse width ratio while maintaining the frequency constant.

6. A multivibrator circuit as set forth in claim 5, wherein the first impedance element and the second impedance element and means to increase and decrease said impedance elements comprises a resistor element of a potentiometer connected between the base electrodes, a movable tap connecting with said resistor element, and a resistor connected between said tap and a source of potential.

7. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, and means simultaneously to change the bias on said emitter electrodes by like amounts to change the frequency of operation while maintaining the pulse width ratio constant.

8. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, a first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, means simultaneously to increase the value of one of said impedance elements and to decrease the value of the other of said impedance elements by like amounts to change the pulse width ratio while maintaining the frequency constant, and means simultaneously to change the bias on said emitter electrodes by like amounts to change the frequency of operation while maintaining the pulse width ratio constant.

9. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, a first unidirectional conductive device connected between the emitter electrode and the base electrode of said first transistor, a second unidirectional conductive device connected between the emitter electrode and the base electrode of said second transistor, said undirectional conductive devices being poled to provide a bypass connection between the emitter electrode and the collector electrode of the associated transistor when the associated transistor is biased non-conductive, and means simultaneously to increase the value of one of said impedance elements and to decrease the value of the other of said impedance elements by like amounts to change the pulse width ratio while maintaining the frequency constant.

10. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second reactive means connected between said second load circuit and the base electrode of said first transistor, a first charging connection including a first impedance element connected to the base electrode of said first transistor, a second charging connection including a second impedance element connected to the base electrode of said second transistor, a first unidirectional conductive device connected between the emitter electrode and the base electrode of said first transistor, a second unidirectional conductive device connected between the emitter electrode and the base electrode of said second transistor, said unidirectional conductive devices being poled to provide a bypass connection between the emitter electrode and the collector electrode of the associated transistor when the associated transistor is biased non-conductive, and means simultaneously to change the bias on said emitter electrodes by like amounts to change the frequency of operation while maintaining the pulse width ratio constant.

11. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second transistor, first reactive means connected between said first load circuit and the base electrode of said second transistor, second ractive means connected between said second load circuit and the base electrode of said first transistor, a first charging connection including a first impedance element connected to the base electrode of said first transistor, a second charging connection including a second impedance element connected to the base electrode of said second transistor, a first unidirectional conductive device connected between the emitter electrode and the base electrode of said first transistor, a second unidirectional conductive device connected between the emitter electrode and the base electrode of said second transistor, said unidirectional conductive devices being poled to provide a bypass connection between the emitter electrode and the collector electrode of the associated transistor when the associated transistor is biased non-conductive, means simultaneously to increase the value of one of said impedance elements and to decrease the value of the other of said impedance elements by like amounts to change the pulse width ratio while maintaining the frequency constant, and means simultaneously to change the bias on said emitter electrodes by like amounts to change the frequency of operation while maintaining the pulse width ratio constant.

12. A multivibrator circuit comprising a first transistor, a second transistor, each of said transistors having an emitter electrode and a collector electrode and a base electrode, a biasing circuit common to the emitter electrodes of said transistors, a first load circuit for the collector electrode of said first transistor, a second load circuit for the collector electrode of said second resistor, a first capacitor connected between said first load circuit and the base electrode of said second transistor, a second capacitor connected between said second load circuit and the base electrode of said first transistor, a potentiometer including a resistor element and a movable tap making contact therewith, said resistor being connected between said base electrodes, a resistance interconnecting said tap and a biasing potential, a first unidirectional conductive device connected between the emitter electrode and the base electrode of said first transistor, a second unidirectional conductive device connected between the emitter electrode and the base electrode of said second transistor, said unidirectional conductive devices being poled to provide a bypass connection between the emitter electrode and the collector electrode of the associated transistor when the associated transistor is biased non-conductive, and a potentiometer in the common biasing circuit of the emitter electrodes to change the biasing potentials and the frequency of operation of the multivibrator while maintaining the pulse width ratio constant, movement of said tap on said resistor element changing the pulse width ratio while maintaining the frequency constant.

References Cited in the file of this patent

UNITED STATES PATENTS

| | | |
|---|---|---|
| 2,737,587 | Trousdale | Mar. 6, 1956 |
| 2,787,712 | Priebe et al. | Apr. 2, 1957 |